US005499006A

United States Patent [19]

Engel et al.

[11] Patent Number: 5,499,006

[45] Date of Patent: Mar. 12, 1996

[54] RADIO FREQUENCY SWITCH AND METHOD OF OPERATION THEREFOR

[75] Inventors: Klaus G. Engel, Waterloo; Regina Kwiatkowska, Kitchener, both of Canada

[73] Assignee: Com Dev Ltd., Cambridge, Canada

[21] Appl. No.: 238,484

[22] Filed: May 5, 1994

[30] Foreign Application Priority Data

Jun. 25, 1993 [CA] Canada .................................. 2099147

[51] Int. Cl.[6] .................................................. H01M 33/00

[52] U.S. Cl. .................................. 335/4; 335/5; 333/105

[58] Field of Search ........................... 335/4–5, 205–207; 333/104–109

[56] References Cited

U.S. PATENT DOCUMENTS 5,065,125 11/1991 Thomson et al. ........................... 335/5

5,281,936 1/1994 Ciezarek ..................................... 335/4

*Primary Examiner*—Lincoln Donovan

*Attorney, Agent, or Firm*—Daryl W. Schnurr

[57] ABSTRACT

A radio frequency switch operates by permanent magnets located in a rotatable actuator. The permanent magnets of the actuator are arranged in groups so that there is at least one magnet in each group that has an opposite polarity to another magnet in the same group. The permanent magnets within the same group are located adjacent to one another. Conductors within an RF cavity have permanent magnets mounted thereon where all of the magnets have the same polarity. The switch can be moved from a first position to a second position by moving the actuator a distance not exceeding 40° and, preferably from 10° to 30°. In the first position, one permanent magnet of one group interacts with the magnet on the conductor to move the conductor. In the second position, another magnet of the same group interacts with the magnet of the conductor to move the conductor. Since the actuator is moved a relatively short distance, the actuator can be moved by a relatively small step motor or the step motor can be replaced by electromagnets in some embodiments. The number of groups of magnets and the number of magnets in each group will vary depending on the type of switch. C-switches, single-pole double-throw switches and T-switches are described. Previous switches have actuators that move much more than 40° between positions, therefore requiring a larger, heavier and more expensive step motor or other mover.

36 Claims, 6 Drawing Sheets

PRIOR ART

RADIO FREQUENCY SWITCH AND METHOD OF OPERATION THEREFOR

BACKGROUND OF THE INVENTION

1. Field of the Invention

This invention relates to switches used to select the routing of radio frequency transmission lines and, more specifically, relates to an improved actuator for magnetically actuated co-axial switches.

2. Description of the Prior Art

Remotely actuated radio frequency switches having magnetically positioned switchable conductors are described in Canadian Patent No. 2,014,585 entitled "C-, S- and T-switches Operated by Permanent Magnets", naming R. Glenn Thomson, et al. as inventors being issued on Nov 3rd, 1992. With these switches, the function of the actuator magnets is limited to providing the necessary attraction or repulsion impetus to position and secure the transmission line conductor in the selected open circuit or closed circuit position. The actuator magnets are individually located in the actuator to achieve a simple layout whereby a single actuator magnet may service one of the switchable conductors in a particular switch state and a different conductor in another state. In such arrangements, the actuator must be displaced by an amount equal to the separation of the switchable conductors in order to achieve a change of switch state. The magnitude of this displacement partly governs the type and size of motor selected to move the actuator. The actuators of the C-switch, S-switch and T-switch described in the Thomson patent rotate 180°, 90° and 120° respectively. Further, where it is desirable for the switch to maintain its selected states in the absence of any holding command or current, either the detent of a permanent magnet motor or some additional detent means must be relied upon to secure the actuator position, thereby increasing the size and type of motor required. The type of switches that are referred to in the Thomson patent as S-switches and C-switches are referred to as C-switches and single-pole double-throw switches respectively in this application. Further switches are described in the Tsoi U.S. Pat. No. 5,063,364 and the Nelson U.S. Pat. No. 4,965,542.

As the transmission lines and switchable conductors of a switch are typically small, the actuator and its motor account for the bulk of the mass and volume of the device. In communication satellite applications, where substantial numbers of such switches are employed on each spacecraft, self-latching and low mass and volume are critical design objectives.

SUMMARY OF THE INVENTION

It is an object of the present invention to provide a latching coaxial switch in a significantly reduced mass and volume compared to prior art switches.

A radio frequency switch has a radio frequency cavity containing at least one conductor that is reciprocatable between a closed position and an open position, said cavity having an input and output. An actuator is located adjacent to said cavity, said actuator supporting a first means for moving said conductor in one direction. The actuator is rotatably mounted with a mover being located to rotate the actuator both clockwise and counterclockwise by activating said mover. The actuator has a first position whereby said conductor is moved between the closed position and the open position. The actuator has a second position located within 40° of said first position, with a second means for moving said conductor in an opposite direction arranged relative to said cavity to move said conductor between the closed position and the open position when said actuator is in said second position. The conductor moves in one direction when the actuator is in the first position and the conductor moves in the opposite direction when the actuator is in the second position.

Preferably, the first and second means for moving said conductor are permanent magnets.

In another embodiment, a radio frequency switch has a radio frequency cavity containing at least one conductor that is reciprocatable between a closed position and an open position. The cavity has an input and an output. An actuator is located adjacent to said cavity, said actuator having one group of permanent magnets for each conductor in said cavity, each group of permanent magnets having at least two permanent magnets that are opposite to one another in polarity, said actuator being rotatably mounted with a mover located to rotate the actuator both clockwise and counterclockwise by activating said mover. The actuator has a first position whereby one permanent magnet of each group is located to move or retain one conductor located within the cavity. In a second position, another permanent magnet of the same group is located to move or retain the same conductor located within the cavity. Each conductor is moved or retained in each position of said switch by permanent magnets of the same group.

A method of operating a radio frequency cavity switch having an actuator with a first permanent magnet mounted thereon has an actuator with two positions. The switch has a radio frequency cavity containing at least one conductor reciprocatable between a closed position and an open position. The cavity has an input and output. The actuator is rotatably mounted with an armature thereon. The armature is located to interact with two electromagnets mounted on said switch, said electromagnets being connected to be activated individually. The method includes the steps of activating a first electromagnet to rotate the actuator clockwise until the armature abuts the electromagnet that has been activated, de-activating said first electromagnet so that the actuator is in a first position, activating a second electromagnet to rotate the actuator counterclockwise so that the armature abuts the second electromagnet, de-activating the second electromagnet so that the actuator is in a second position, alternately activating one electromagnet and de-activating the other electromagnet to move the actuator between the first and second positions.

DESCRIPTION OF A PREFERRED EMBODIMENT

Figure 1:
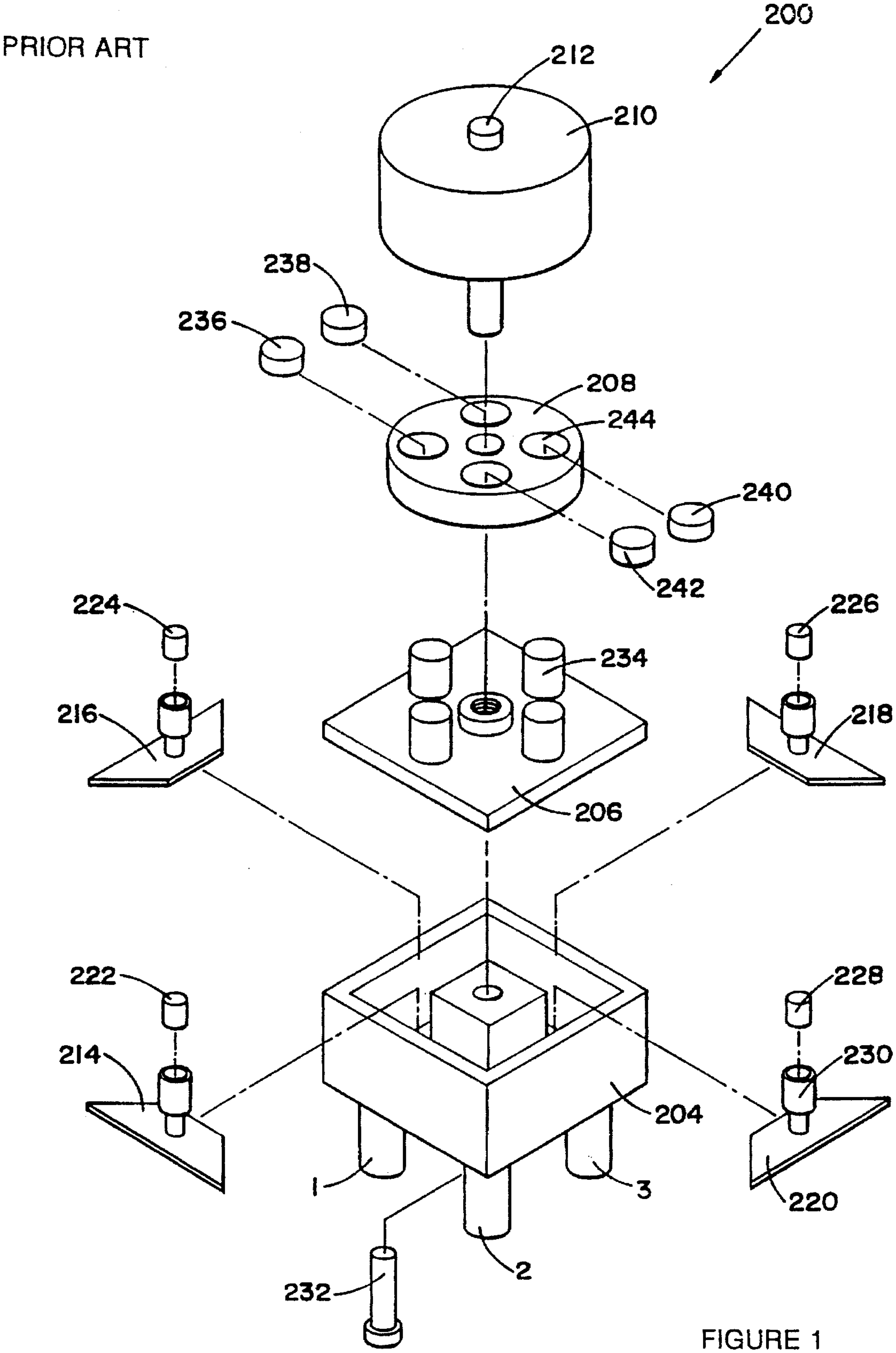
FIG. 1 is an exploded perspective view of a prior art co-axial magnetic transfer switch.

In FIG. 1, a prior art switch 200 has a radio frequency (henceforth RF) cavity 204 with a cover 206. Outside of the cavity 204, there is located an actuator 208 and motor 210. The motor is connected to the actuator 208 by a shaft 212. Within the cavity 204, there is located four switchable conductors 214, 216, 218, 220 with attached magnets 222, 224, 226, 228 respectively, said magnets all having parallel axes and being mounted in holders 230. A bolt 232 holds the cover 206 on the cavity. The cover 206 has cylindrically-shaped projections to accommodate holders 230 of the conductors 214, 216, 218,220.

The actuator 208 contains four permanent magnets 236, 238, 240, 242, the actuator being rotatable with the shaft 212 of the motor 210. Actuator magnets 238, 242 have magnetic axes that are anti-parallel to the magnetic axes of actuator magnets 236, 240. The actuator magnets are aligned with the conductor magnets in each position of the actuator so that two conductors will be repelled into a closed circuit position and two conductors will be attracted into an open circuit position. By rotating the actuator through 90° from a first position to a second position using the motor 210, the two conductors that had been closed will be attracted to the open position and the two conductors that had been open will be repelled to the closed position. The motor 210 is required to provide suitable torque over the entire angular displacement between the two actuator positions. Any torque experienced by the actuator resulting from interaction between the actuator magnets and the conductor magnets is operative over a small angular displacement and will typically change directional sense before diminishing entirely in magnitude. The actuator exhibits stable rest positions between standard positions in the absence of any additional unpowered holding torque applied to the actuator. The switch 200, being a C-switch has four ports one, two, three, four, only three of which are shown in FIG. 1.

Figure 2:
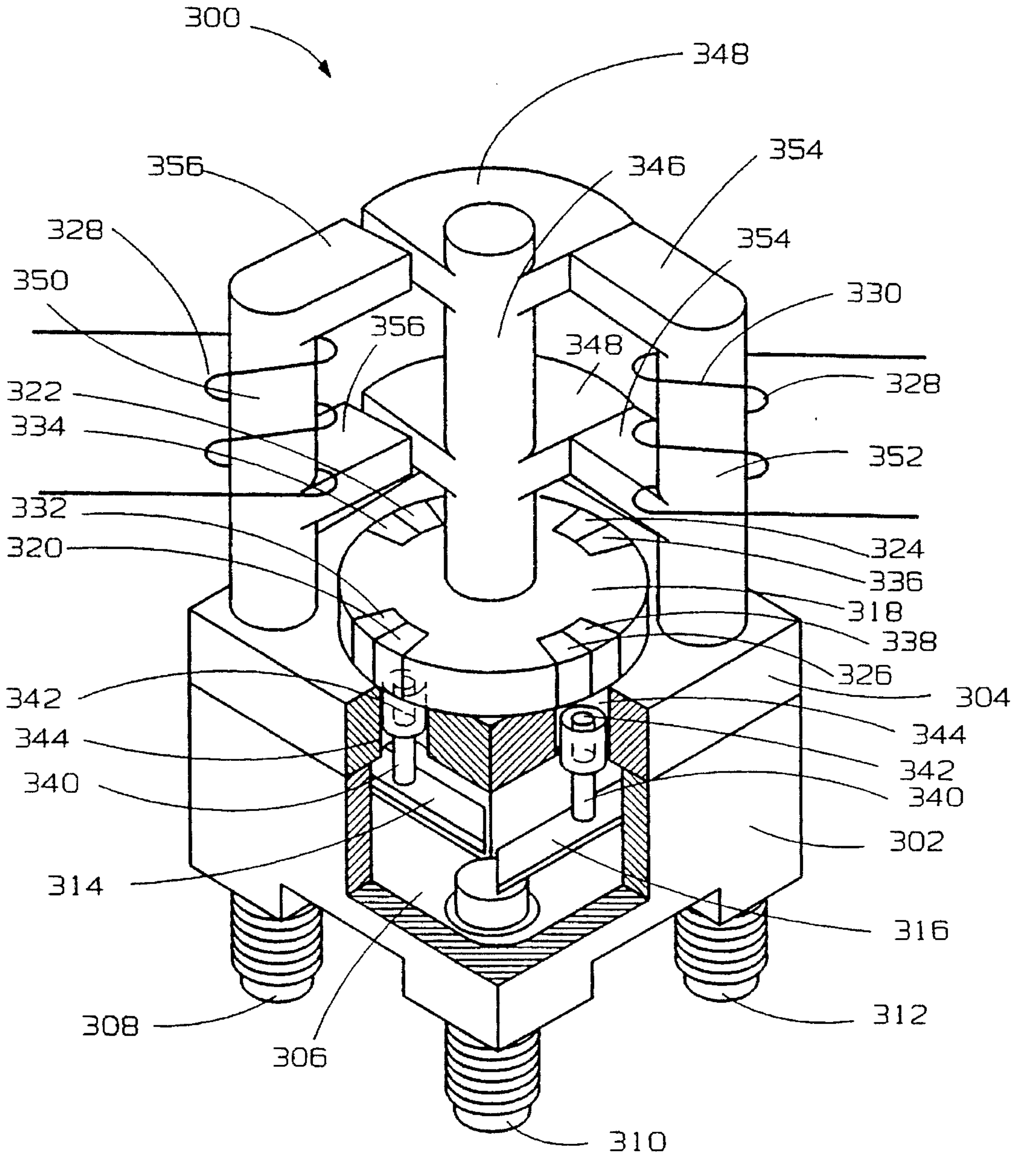
FIG. 2 is a perspective view of a co-axial magnetic C-switch of the present invention with a radio frequency cavity partially cut away.

In FIG. 2, a radio frequency switch 300 has a housing 302 with a magnetically transparent cover 304 enclosing an RF cavity 306. The switch is a C-switch and has four ports (being inputs and outputs) of which three ports 308, 310 and 312 are shown. The cavity 306 contains four conductors 314, 316 (only two of which are shown in FIG. 2), each conductor being reciprocatable between a closed position and an open position. An actuator 318 is located adjacent to the cover 304 of the cavity 306, said actuator 318 supporting four groups of permanent magnets, each group having one of four first permanent magnet 320, 322, 324, 326 and one of four second permanent magnet 332, 334, 336, 338. The actuator 318 is rotatably mounted with two electromagnets 350, 352, being located to rotate the actuator 318 both clockwise and counterclockwise by activating one electromagnet 350 and subsequently activating the other electromagnet 352.

The second permanent magnets 332, 334, 336, 338 are arranged relative to said cavity 306 to move the four c6nductors 314, 316 (only two of which are shown) between the open position and the closed position. The second permanent magnets 332, 334, 336, 338 are located on the actuator with one second permanent magnet being located adjacent to each first permanent magnet. The first permanent magnets have an opposite polarity to the second permanent magnets.

There are four conductors in the cavity (only two of which are shown), the conductors being arranged in a similar manner to the conductors of the prior art switch shown in FIG. 1. On each conductor, there is mounted an non-conducting holder 340, each holder being hollow and containing a third permanent magnet 342. The magnets 342 preferably all have the same polarity. The holders 340 are sized and shaped to slide axially within bores 344 in the cover 304. The cover 304 provides one wall of the cavity 306. The bores provide guide means for the holder and therefore for the conductors. The switch 300 has four waveguide paths within the cavity and the holders 340 are sized so that the magnets 342 do not enter the waveguide path but always remain within the bores 344 whether the conductors are in a closed position or open position. The holders 340 move in and out of the bores 344 as the conductors move between the closed position and open position.

The actuator 318 is affixed to a rotatable shaft 346. The shaft 346 has two armatures 348 thereon. Two electromagnets 350, 352 have coils 328, 330 respectively that are connected in a conventional manner (not shown) so that the electromagnets can be activated and de-activated individually. The electromagnet 352 is activated to attract one side of each armature 348 against abutments 354. The electromagnet 352 is then de-activated and when it is desired to move the actuator to the second position, the electromagnet 350 is activated to attract one side of the armatures 348 against the abutments 356. The switch could be designed with only one armature and one abutment on each electromagnet or with more than two armatures.

The groups of magnets are equally spaced from one another on the actuator. In a first position of the actuator (as shown in FIG. 2), two of the first permanent magnets 320, 324 and two of the second permanent magnets 334, 338 cause the conductors to move and in a second position (not shown) of the actuator, two of the first permanent magnets 322, 326 and two of the second permanent magnets 332, 336 cause the conductors to move. In each position, there is one magnet of each group aligned with the third permanent magnet on the conductor and that aligned magnet influences the conductor to move to either the closed position or the open position. Since the magnets of each group are located immediately adjacent to one another, the actuator need only be moved a very short distance from the first position to the second position, said distance being equal to a distance between a centre of the first permanent magnet and a centre of the second permanent magnet for each group. In the first position, two of the four conductors are attracted to the first permanent magnets aligned with the third permanent magnets of those conductors and the remaining two conductors are repelled by the second permanent magnets aligned with the third permanent magnets of those conductors. In the second position, the two conductors that were previously attracted by first permanent magnets are repelled by second permanent magnets and the two conductors that were previously repelled by the second permanent magnets are attracted by first permanent magnets. Thus, as the actuator is moved from the first position to the second position so that one magnet of each group is moved out of alignment with the third permanent magnets of each conductor and the remaining magnet of each group are moved into alignment with said third magnets, two of the conductors will move from a closed position to an open position and the remaining two conductors will move from an open position to a closed position. By appropriately sizing and/or spacing the magnets of each group relative to one another, the movement of all the conductors can be simultaneous as the actuator moves through a transition point from the first position to the second position or vice-versa. Alternatively, the switch can be designed to exhibit either a break before make characteristic or a make before break characteristic.

During the movement of the actuator from the first position to the second position, angular zones of influence of attracting magnets transform continuously into zones of influence of repelling magnets. The actuator will experience net lateral forces resulting in torque toward a standard switch state throughout the switch cycle (except at the transition point), thereby providing the desired unpowered holding torque to hold the conductors into position when the electromagnets are de-activated. The distance that the actuator moves between the first and second position will range from approximately 10° to approximately 30° depending on the size and/or spacing of the permanent magnets on the actuator. Preferably, the movement of the actuator is substantially 20° from one position to the other for a C-switch.

Abutments 354, 356 prevent the armatures from over-rotating. The armatures 348 are ferro-magnetic and are made of a magnetically soft material in the same manner as a conventional variable reluctance device. Since the actuator displacement between the first position and the second position is relatively small compared to prior art switches, the electromagnets described can be utilized and provide a simpler, more reliable and lighter drive means than the step motors of prior art switches. Since a less massive actuator can be constructed, the holding torque required to hold the actuator in either the first or second position is also reduced, thereby further reducing the size of the electromagnets required to move the actuator. Similarly, when a step motor is used as a mover to move the actuator between positions, the step motor can be made smaller than previous step motors for the same size cavity. In the satellite communications field, where these switches are utilized, only weight or volume reduction is extremely important.

Figure 3:
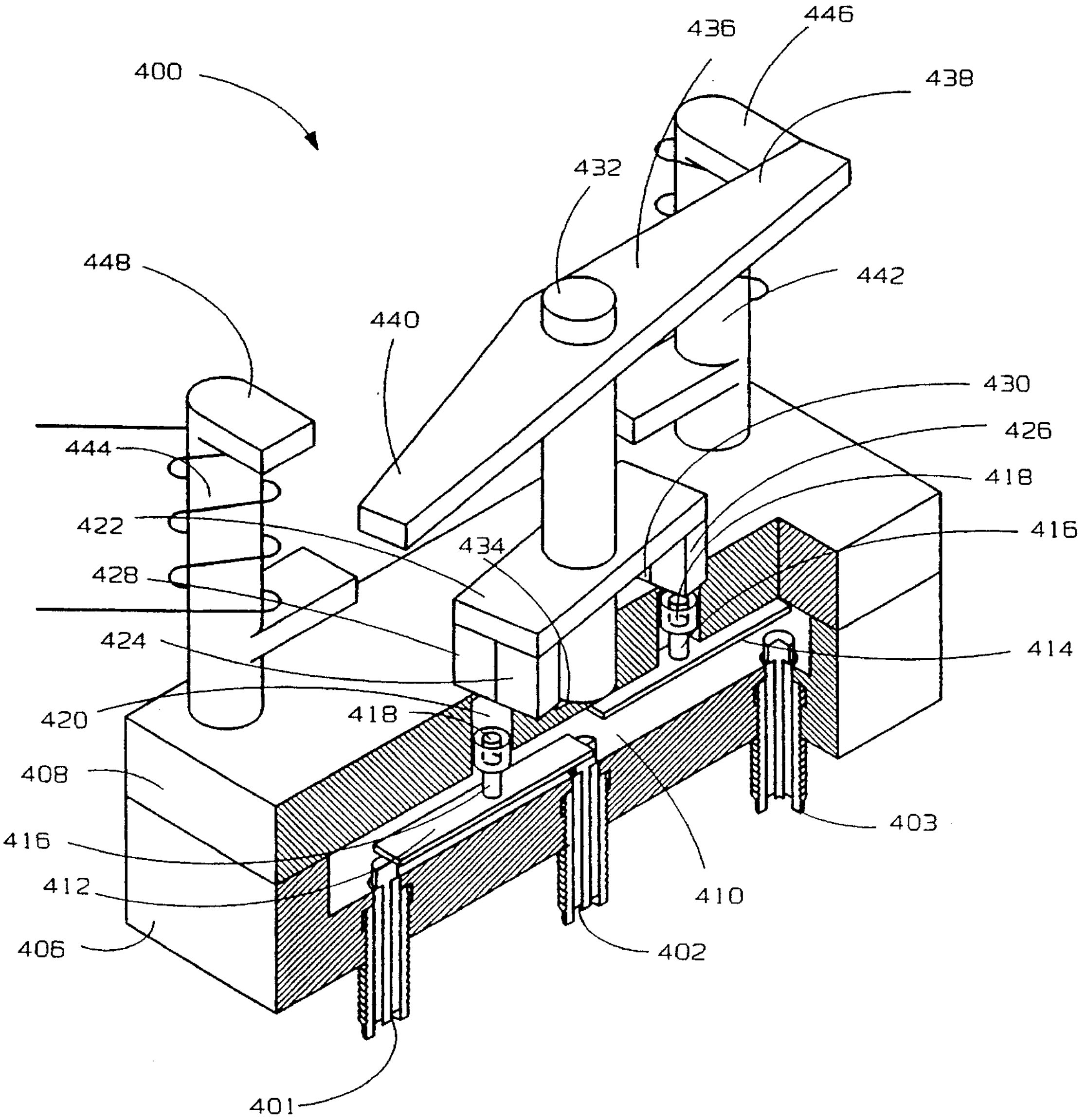
FIG. 3 is a perspective view of a co-axial magnetic single-pole double-throw switch with a radio frequency cavity partially cut away.

In FIG. 3, a co-axial single-pole double-throw switch or C-switch 400 is shown. The switch 400 has three ports 401, 402, 403 and a housing 406 with a cover 408 enclosing an RF cavity 410. The waveguide cavity 410 contains two conductors 412, 414. Each conductor has a holder 416 with a third permanent magnet 418 supported therein. The holders 416 are sized to fit within cylindrical bores 420 of the cover 408. The actuator 422 has first permanent magnets 424, 426 and second permanent magnets 428, 430 mounted thereon. The magnets 424, 428 form a first group and have an opposite polarity to one another and the magnets 426, 430 form a second group and have an opposite polarity to one another. The first permanent magnets 424, 426 have the same polarity and the second permanent magnets 428,430 have the same polarity.

The actuator 422 is affixed to a shaft 432 having a lower end that is rotatably mounted in an opening 434 in the cover 408. An upper end of the shaft 432 has an armature 436 thereon, the armature having two ends 438, 440. Two electromagnets 442, 444 are mounted on the cover 408. The electromagnet 442 has an abutment 446 and the electromagnet 444 has an abutment 448. In a first position of the switch shown in FIG. 3, the electromagnet 442 has been activated so that the abutment 446 attracts the end 438 of the armature 436. This causes the first permanent magnet 428 and the second permanent magnet 426 to be aligned with the third magnets of the conductors 412, 414. In the first position shown in FIG. 3, the first permanent magnet 428 repels the conductor 412 to the closed position, thereby connecting ports 401 and 402. Simultaneously, the second permanent magnet 426, attracts the conductor 414 to the open position shown in FIG. 3. Once the switch is in the first position, the electromagnet 442 can be de-activated and the switch will remain in that position through the detent forces of the magnets of each group on the third magnets of the conductors.

By activating the electromagnet 444, the end 440 of the armature 436 will be attracted to the abutment 448 thereby rotating the actuator 422 counterclockwise (when viewed from above in FIG. 3) and aligning the first permanent magnet 424 and the second permanent magnet 430 with the third magnets 418 of the conductors. The conductors will then move in the opposite direction (not shown), the magnet 418 of the conductor 412 being attracted to the magnet 424 and moving upwards from the closed position to the open position. Simultaneously, the magnet 418 of the conductor 414 will be repelled by the magnet 430 and will move from the open position shown in FIG. 3 to the closed position, thereby connecting ports 402 and 403. As with the switch 300, the movement can be simultaneous, make before break or break before make.

As can be seen, the interaction of the actuator and the conductors are essentially the same for switch 400 as they are for switch 300. As with the switch 300, the armature 436 is ferro-magnet and is made of magnetically soft material.

Figure 4:
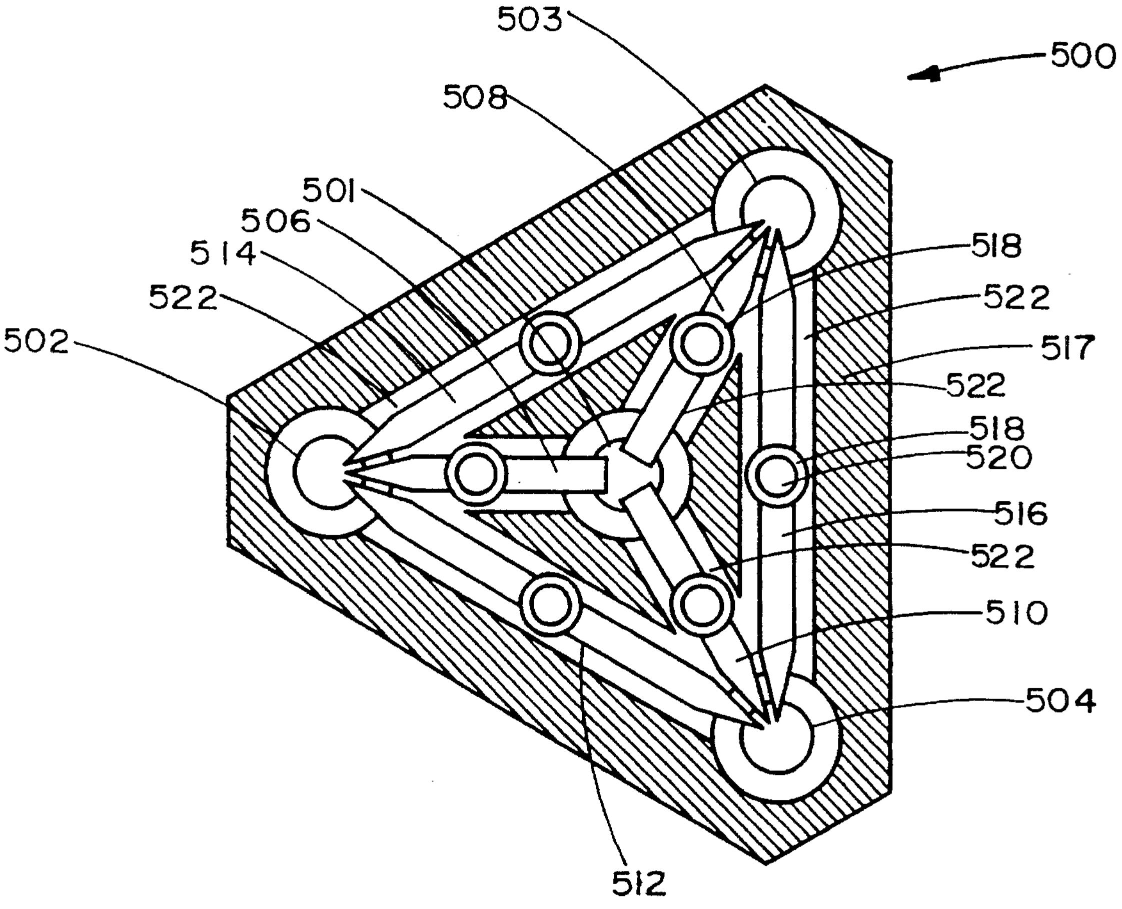
FIG. 4 is a top sectional view of a radio frequency cavity of a co-axial magnetic T-switch.
Figure 5:
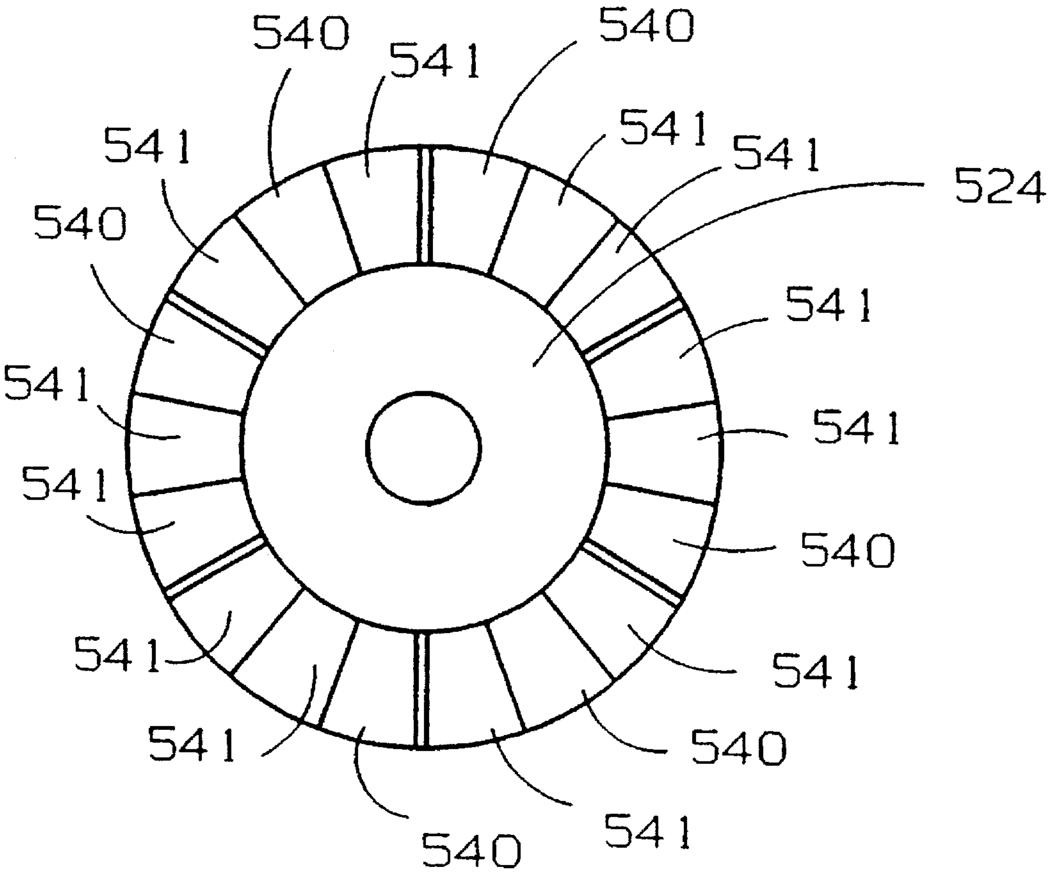
FIG. 5 is a schematic top view of an actuator for the switch of FIG. 4.

In FIGS. 4 and 5, there is shown a sectional top view of part of a T-switch 500. The switch 500 has four ports 501, 502, 503,504 and six conductors 506, 508, 510, 512, 514, 516 located with a cavity 517. Each conductor has a holder 518 and third permanent magnet 520. The cavity 517 has six waveguide channels 522 and the switch 500 has three distinct positions with two conductors closed and four conductors open at each switch position. When the conductors 506, 516 are closed, the remaining conductors are open. When the conductors 508, 512 are closed, the remaining conductors are open and when the conductors 510, 514 are closed, the remaining conductors are open.

In FIG. 5, there is shown an actuator 524 that is used with the T-switch of FIG. 4. The actuator 524 has six groups of three permanent magnets each equally spaced around a circumference of the actuator. Actuator magnets 540 have magnetic axes parallel to each other and anti-parallel to actuator magnets 541. The magnets 540 are first permanent magnets and the magnets 541 are second permanent magnets. The actuator magnets 540 repel the third magnets 520 on the conductors and actuator magnets 541 attract the third magnets 520 on the conductors. The actuator 524 has three positions, each position being approximately 20° apart from a previous position, the full range of movement of the actuator being approximately 40° from the first position to the third position in, for example, a clockwise direction. However, the distance from the first to the third position in a counterclockwise direction will be approximately 20°. The range of movement from the first position to the second position and from the second position to the third position is approximately 20°. Thus, the T-switch can be designed where the maximum range of movement from one position to any other position will not exceed 20°. It can be seen that in any one position of the actuator, two magnets 540, being 180° apart from one another are aligned with two of the third magnets 520 that are 180° apart from one another, thereby moving two conductors to the closed position. The remaining four third magnets 520 are aligned with four magnets 541 and the corresponding conductors are therefore attracted to the open position.

Figure 6:
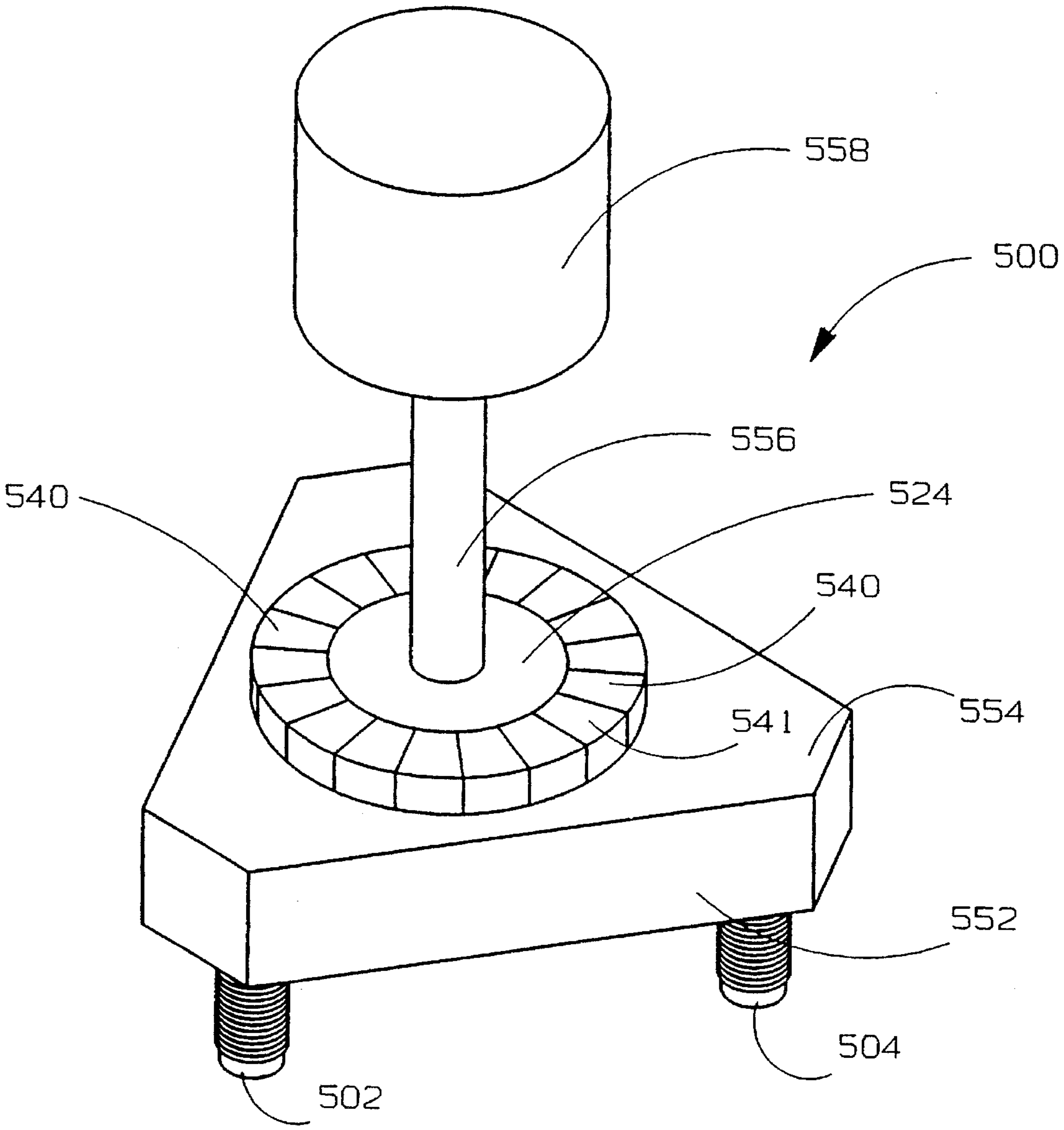
FIG. 6 is a perspective view of an assembled T-switch.

In FIG. 6, there is shown a perspective view of the T-switch 500 having a housing 552 with a cover 554 enclosing a cavity 524 (not shown in FIG. 6). The switch has four ports 502, 504 (only two of which are shown in FIG. 6). The actuator 524 has six groups of magnets 540, 541 thereon as described in detail in FIG. 5. The actuator 524 is affixed to a shaft 556 which is rotatably mounted in the cover 554. A variable reluctance step motor 558 has three independent electromagnetic phases, one for each of the three positions of the switch 550.

Numerous variations, within the scope of the attached claims, will be readily apparent to those skilled in the art. The permanent magnets could be arranged in various ways. For example, the first permanent magnets could be made to repel the conductor magnets and the second permanent magnets could be made to attract the conductor magnets. The second permanent magnets could be located away from the actuator and could attract the third magnets with that attraction being overcome by the attraction of the first permanent magnets when they are aligned with the third magnets. The switch could be designed so that attracting magnets move the conductors to a closed position and repelling magnets move the conductors to an open position. The first and second permanent magnets could all have the same size or the first permanent magnets could be larger than the second permanent magnets or the second permanent magnets could be larger than the first permanent magnets.

The latching of the switch could be accomplished without permanent magnets. For example, the first means for moving the conductor could be a projection on the actuator and the second means for moving the conductor could be a return spring or vice-versa. The first means could be a series of projections and the second means could be a series of return springs. The return springs would preferably be located on a side of each conductor away from the actuator.

The switches of the present invention have advantages over previous switches in that the step motor can be lighter and less expensive than step motors of previous switches because the actuator moves only a short distance between positions and the step motor is not required to provide detent means to maintain the switch in a particular position. Also, the movement from one position to another is much faster than prior art switches. Further, there is a large degree of flexibility for break before make and make before break designs. Also, when electromagnets are used in place of the step motor, further weight savings and cost savings can be achieved. Weight savings and cost savings are both extremely important in the satellite communications industry where these switches are designed to be used.

What we claim as our invention is:

1. A radio frequency switch comprising a radio frequency cavity containing at least one conductor that is reciprocatable between a closed position and an open position, said cavity having an input and output, an actuator located adjacent to said cavity, said actuator supporting a first permanent magnet, said actuator being rotatably mounted with a mover being located to rotate the actuator both clockwise and counterclockwise by activating said mover, said actuator having a first position whereby said conductor is moved between the closed position and the open position, said actuator having a second position located within 40° of said first position, with a second permanent magnet arranged relative to said cavity to move said conductor between the closed position and the open position when said actuator is in said second position, the conductor moving in one direction when the actuator is in the first position and the conductor moving in the opposite direction when the actuator is in the second position.

2. A switch as claimed in claim 1 wherein the second permanent magnet is mounted on the actuator, the second permanent magnet having an opposite polarity facing the cavity than the first permanent magnet and the conductor having a third permanent magnet mounted thereon with a polarity whereby the third permanent magnet is attracted to the first permanent magnet when the actuator is in the first position and repelled by the second permanent magnet when the actuator is in the second position, thereby moving the conductor between the closed and open positions.

3. A switch as claimed in claim 1 wherein the mover is two electromagnets that are located to move the actuator clockwise and counterclockwise by a sufficient distance so that in a first position of the actuator the first permanent magnet influences the conductor and in a second position, the first permanent magnet is moved away from the conductor so that the conductor is influenced by the second permanent magnet, said electromagnets being connected so that they can be activated and de-activated independently of one another.

4. A switch as claimed in any one of claims 1, 2 or 3 wherein the mover operates to move the actuator clockwise and counterclockwise through a range of approximately 10° to approximately 30° between said first and second positions.

5. A switch as claimed in any one of claims 1, 2 or 3 wherein the mover operates to move the actuator clockwise and counterclockwise through a range of approximately 20° between said first and second positions.

6. A switch as claimed in claim 2 wherein the first permanent magnet and second permanent magnet are mounted on the actuator adjacent to one another so that either of the first permanent magnet and the second permanent magnet can influence the third permanent magnet by moving the actuator a short distance.

7. A switch as claimed in claim 6 wherein the first permanent magnet and second permanent magnet are located immediately adjacent to one another.

8. A switch as claimed in any one of claims 1, 2 or 3 wherein a detent for the switch is provided by an interaction between at least one of the first permanent magnet and the second permanent magnet and the conductor.

9. A switch as claimed in any one of claims 1, 2 or 3 wherein the mover is two electromagnets, one electromagnet being located to move the actuator clockwise and another electromagnet being located to move the actuator counterclockwise.

10. A switch as claimed in any one of claims 1, 2 or 3 wherein the mover is two electromagnets located to move the actuator clockwise and counterclockwise, the actuator having an armature thereon, said armature being located so that said armature can interact with one of the electromagnets to move the actuator clockwise and with the other of the electromagnets to move the actuator counterclockwise.

11. A switch as claimed in any one of claims 1, 2 or 3 wherein the mover is two electromagnets and one armature, each electromagnet attracting said armature in turn to rotate the actuator.

12. A switch as claimed in any one of claims 1, 2 or 3 wherein the switch has at least two conductors and there is a group of permanent magnets for each conductor, there being one first permanent magnet and one second permanent magnet in each group, said groups being equally spaced from one another on said actuator.

13. A switch as claimed in claim 2 wherein the switch has more than one conductor and there is one third permanent magnet for each conductor.

14. A switch as claimed in any one of claims 1, 2 or 3 wherein there is continuous interaction between the first permanent magnet, the second permanent magnet and the conductor throughout a range of movement of the actuator.

15. A switch as claimed in any one of claims 1, 2 or 3 wherein the cavity contains two conductors and there is a first permanent magnet and a second permanent magnet for each conductor.

16. A switch as claimed in any one of claims 1, 2 or 3 wherein the cavity contains three conductors and there is a first permanent magnet and a second permanent magnet for each conductor.

17. A switch as claimed in any one of claims 1, 2 or 3 wherein the cavity contains four conductors and there is a first permanent magnet and a second permanent magnet for each conductor.

18. A switch as claimed in any one of claims 1, 2 or 3 wherein the mover is two electromagnets and the electromagnets provide an abutment to meet an armature on said actuator to limit the distance that the actuator moves when an electromagnet is activated.

19. A switch as claimed in claim 2 wherein the third permanent magnet for each conductor moves longitudinally within a bore located in a wall of the cavity when the conductor moves between an open position and a closed position, said first permanent magnet always being located within said passage during operation of said switch and not being located within a waveguide path of said switch.

20. A switch as claimed in claim 3 wherein the switch is an S-switch with two conductors, there being one group of first and second permanent magnets for each conductor.

21. A switch as claimed in any one of claims 1 or 2 wherein the switch is a T-switch and there are six conductors, there being one group of first and second permanent magnets for each conductor, said switch having a third position and said mover being a step motor.

22. A switch as claimed in any one of claims 1 or 2 wherein the switch is a T-switch and there are six conductors, there being one group of first and second permanent magnets for each conductor, said switch having a third position and said mover being a step motor, each group of first and second permanent magnets having one first permanent magnet and two second permanent magnets, in each position of said switch, there being two first permanent magnets to move two conductors to a closed position and there being four second permanent magnets located to move four conductors to an open position.

23. A switch as claimed in any one of claims 1 or 2 wherein the switch is a T-switch and there are six conductors, there being one group of first and second permanent magnets for each conductor, said switch having a third position and said mover being a step motor, each group of first and second permanent magnets having one first permanent magnet and two second permanent magnets, in each position of said switch, there being two first permanent magnets located to move two conductors to a closed position and there being four second permanent magnets located to move four conductors to an open position, there being a distance of substantially 20° between each position.

24. A switch as claimed in claim 3 wherein the switch is a C-switch having four conductors, there being one group of first and second permanent magnets for each conductor.

25. A radio frequency switch comprising a radio frequency cavity containing at least one conductor that is reciprocatable between a closed position and an open position, said cavity having an input and output, an actuator located adjacent to said cavity, said actuator supporting a first means for moving said conductor in one direction, said actuator being rotatably mounted with a mover being located to rotate the actuator both clockwise and counterclockwise by activating said mover, said actuator having a first position whereby said conductor is moved between the closed position and the open position, said actuator having a second position located within 40° of said first position, with a second means for moving said conductor in an opposite direction arranged relative to said cavity to move said conductor between the closed position and the open position when said actuator is in said second position, the conductor moving in one direction when the actuator is in the first position and the conductor moving in the opposite direction when the actuator is in the second position.

26. A radio frequency switch comprising a radio frequency cavity containing at least one conductor that is reciprocatable between a closed position and an open position, said cavity having an input and an output, an actuator located adjacent to said cavity, said actuator having one group of permanent magnets for each conductor in said cavity, each group of permanent magnets having at least two permanent magnets that are opposite to one another in polarity, said actuator being rotatably mounted with a mover located to rotate the actuator both clockwise and counterclockwise by activating said mover, said actuator having a first position whereby one permanent magnet of each group is located to move or retain one conductor located within the cavity and, in a second position, another permanent magnet of the same group is located to move or retain the same conductor located within the cavity, each conductor being moved or retained in each position of said switch by permanent magnets of the same group.

27. A switch as claimed in claim 26 wherein the magnets within the same group are located adjacent to one another.

28. A switch as claimed in claim 27 wherein the switch is selected from the group of a C-switch or a single-pole double-throw switch and there are two permanent magnets in each group.

29. A switch as claimed in claim 27 wherein the switch is a T-switch and there are three permanent magnets in each group.

30. A method of operating a radio frequency cavity switch having an actuator with a first permanent magnet mounted thereon, said actuator having two positions, said switch having a radio frequency cavity containing at least one conductor reciprocatable between a closed position and an open position, said cavity having an input and output, said actuator being rotatably mounted with an armature thereon, said armature being located to interact with two electromagnets mounted on said switch, said electromagnets being connected to be activated individually, said method comprising activating a first electromagnet to rotate the actuator clockwise until the armature abuts the electromagnet that has been activated, de-activating said first electromagnet so that the actuator is in a first position, activating a second electromagnet to rotate the actuator counterclockwise so that the armature abuts the second electromagnet, de-activating the second electromagnet so that the actuator is in a the second position, alternately activating one electromagnet and de-activating the other electromagnet to move the actuator between the first and second positions.

31. A method as claimed in claim 30 where the actuator has a second permanent magnet located adjacent to the first permanent magnet, the first and second magnets being of opposite polarity, said conductor having a third permanent magnet thereon, said method including the steps of activating one electromagnet to move the actuator clockwise so that the first magnet attracts the third magnet, thereby moving the conductor to the open position, de-activating the electromagnet so activated, activating another electromagnet to move the actuator counterclockwise so that the second magnet repels the third magnet, thereby moving the conductor to the closed position, de-activating the other electromagnet.

32. A method as claimed in claim 30 including the steps of de-activating the electromagnets to allow the permanent magnets in the actuator to act as a detent for the actuator.

33. A method as claimed in claim 31 including the steps of operating the switch to move the conductor by moving the actuator in a range of approximately 10° to approximately 30°.

34. A method as claimed in claim 31 including the steps of moving the actuator approximately 20° to operate the switch.

35. A method of operating a radio frequency switch having an actuator having a first permanent magnet mounted thereon and a second permanent magnet mounted thereon adjacent to said first permanent magnet, said actuator having two positions, said switch having a radio frequency cavity containing at least one conductor reciprocatable between a closed position and an open position, said cavity having an input and output, said actuator being rotatably mounted and connected to a mover, each conductor having a third permanent magnet mounted thereon, said first permanent magnet and said second permanent magnet having an opposite polarity, said method comprising the steps of commencing with said actuator in a first position, activating the step motor to move the actuator a distance of substantially 20° clockwise from said first position to said second position and de-activating said step motor, re-activating said step motor to move said actuator counterclockwise substantially 20° from said second position to said first position and de-activating said step motor.

36. A method as claimed in claim 35 wherein the switch has three positions and there is one group of permanent magnets on the actuator for each conductor, each group having one first permanent magnet and two second permanent magnets, the mover being a step motor, said method comprising the steps of activating the step motor when the switch is in the second position to move the actuator clockwise from the second position to the third position a distance of substantially 20° and de-activating the step motor, subsequently activating the step motor to move the actuator clockwise from the third position to the first position a distance of substantially 20° and de-activating the step motor, subsequently activating the step motor to move the actuator to any other position in either direction.

* * * * *